United States Patent
Okada et al.

(10) Patent No.: US 10,183,564 B2
(45) Date of Patent: Jan. 22, 2019

(54) BODY STRUCTURE OF VEHICLE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Yusuke Okada, Tokyo (JP); Shinya Nakamura, Tokyo (JP); Sosuke Wada, Tokyo (JP); Koji Tomobuchi, Okazaki (JP); Teruichi Manabe, Okazaki (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-Shi, Aichi (JP)

( * ) Notice: Subject to any disclaimer, the term of this patent is extended or adjusted under 35 U.S.C. 154(b) by 0 days.

(21) Appl. No.: 15/661,544

(22) Filed: Jul. 27, 2017

(65) Prior Publication Data

US 2018/0029459 A1 Feb. 1, 2018

(30) Foreign Application Priority Data

Jul. 28, 2016 (JP) ................. 2016-148744

(51) Int. Cl.
| | |
|---|---|
| *B60K 1/04* | (2006.01) |
| *B60K 6/28* | (2007.10) |
| *B60L 11/18* | (2006.01) |
| *B62D 25/20* | (2006.01) |
| *B60K 1/00* | (2006.01) |

(52) U.S. Cl.
CPC ............... *B60K 1/04* (2013.01); *B60K 6/28* (2013.01); *B60L 11/1877* (2013.01); *B62D 25/20* (2013.01); *B60K 2001/008* (2013.01); *B60K 2001/0438* (2013.01); *B60Y 2200/91* (2013.01); *B60Y 2200/92* (2013.01); *Y10S 903/907* (2013.01)

(58) Field of Classification Search
CPC . B60K 1/04; B60K 6/28; B62D 25/08; B62D 25/20
See application file for complete search history.

(56) References Cited

U.S. PATENT DOCUMENTS

| | | | | |
|---|---|---|---|---|
| 5,490,572 | A * | 2/1996 | Tajiri | B60H 1/00278 180/65.1 |
| 6,188,574 | B1 * | 2/2001 | Anazawa | B60K 1/04 180/68.5 |
| 6,808,229 | B2 * | 10/2004 | Yamaguchi | B62D 25/08 296/203.02 |
| 7,654,351 | B2 * | 2/2010 | Koike | B60K 1/04 180/68.1 |

(Continued)

FOREIGN PATENT DOCUMENTS

| | | |
|---|---|---|
| EP | 2241467 A1 | 10/2010 |
| JP | 5645147 B2 | 12/2014 |

*Primary Examiner* — Hau V Phan
(74) *Attorney, Agent, or Firm* — Birch, Stewart, Kolasch & Birch, LLP

(57) ABSTRACT

A body structure of a vehicle includes a floor panel, a battery pack, an electric water heater (electric apparatus), and a bracket which mounts the electric water heater to the floor panel. The electric water heater is mounted to the floor panel so as to set a battery pack side of the electric apparatus higher.

10 Claims, 7 Drawing Sheets

(56) References Cited

U.S. PATENT DOCUMENTS

| | | | |
|---|---|---|---|
| 8,182,393 B2* | 5/2012 | Gillingham | B60K 1/04 477/10 |
| 8,708,079 B2* | 4/2014 | Hashimura | B62D 25/2027 180/311 |
| 8,708,402 B2* | 4/2014 | Saeki | B60K 1/04 180/68.5 |
| 8,978,617 B2* | 3/2015 | Matsuda | F02B 77/00 123/198 E |
| 9,033,078 B2* | 5/2015 | Fillion | B60K 1/04 180/65.31 |
| 2010/0101885 A1* | 4/2010 | Nozaki | B60K 1/00 180/232 |
| 2011/0297467 A1* | 12/2011 | Iwasa | B60K 1/04 180/65.31 |
| 2012/0018238 A1* | 1/2012 | Mizoguchi | B60K 1/04 180/68.5 |
| 2012/0055724 A1* | 3/2012 | Iwasa | B60K 1/04 180/68.5 |
| 2012/0055725 A1* | 3/2012 | Mizoguchi | B60K 1/04 180/68.5 |
| 2013/0298586 A1 | 11/2013 | Hwang et al. | |
| 2014/0246259 A1* | 9/2014 | Yamamura | B60K 1/04 180/68.5 |
| 2014/0262573 A1* | 9/2014 | Ito | B60K 1/04 180/68.5 |
| 2014/0338997 A1* | 11/2014 | Okada | B62D 25/20 180/68.5 |
| 2014/0374180 A1* | 12/2014 | Katayama | B60K 1/04 180/68.5 |

* cited by examiner

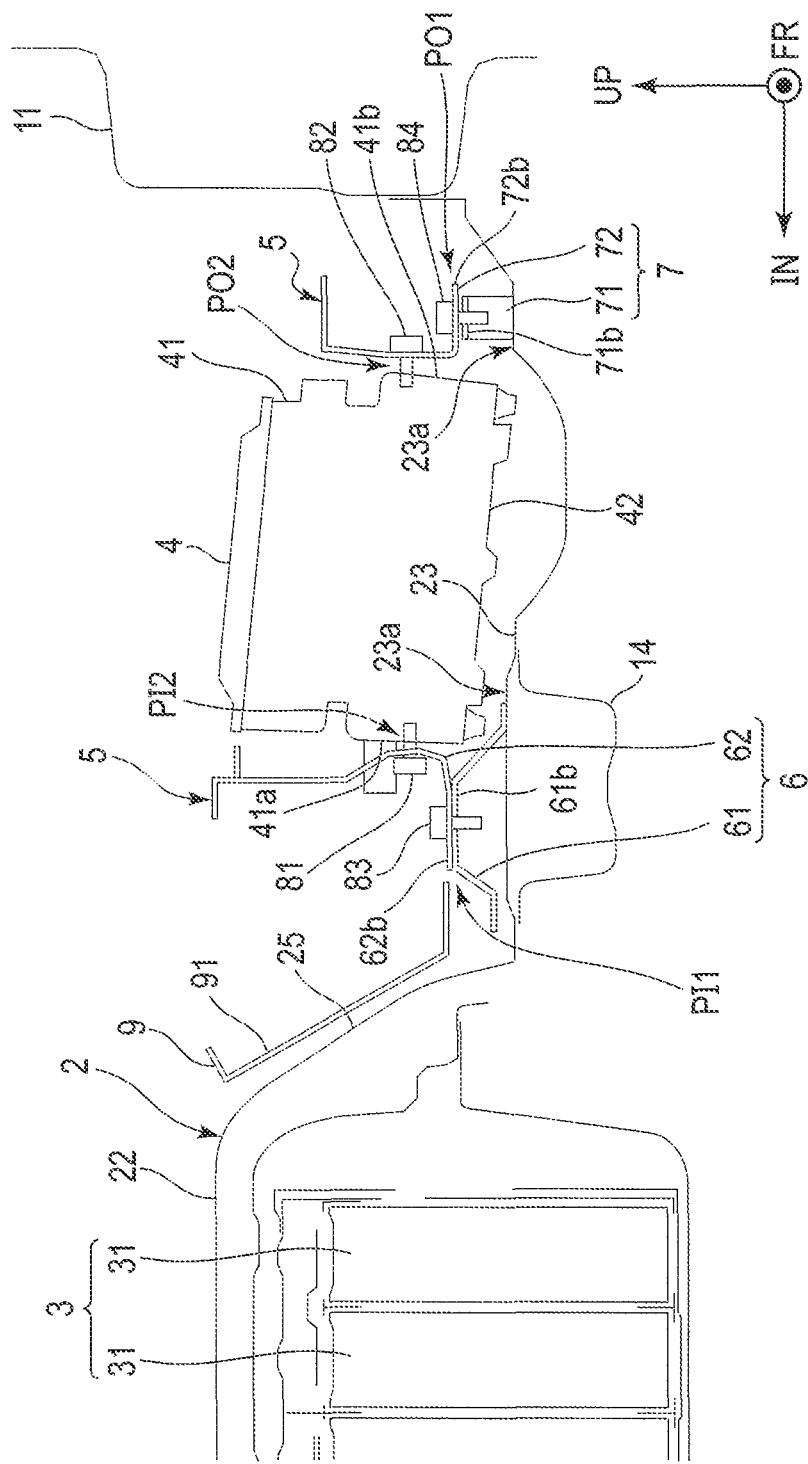
F I G. 2

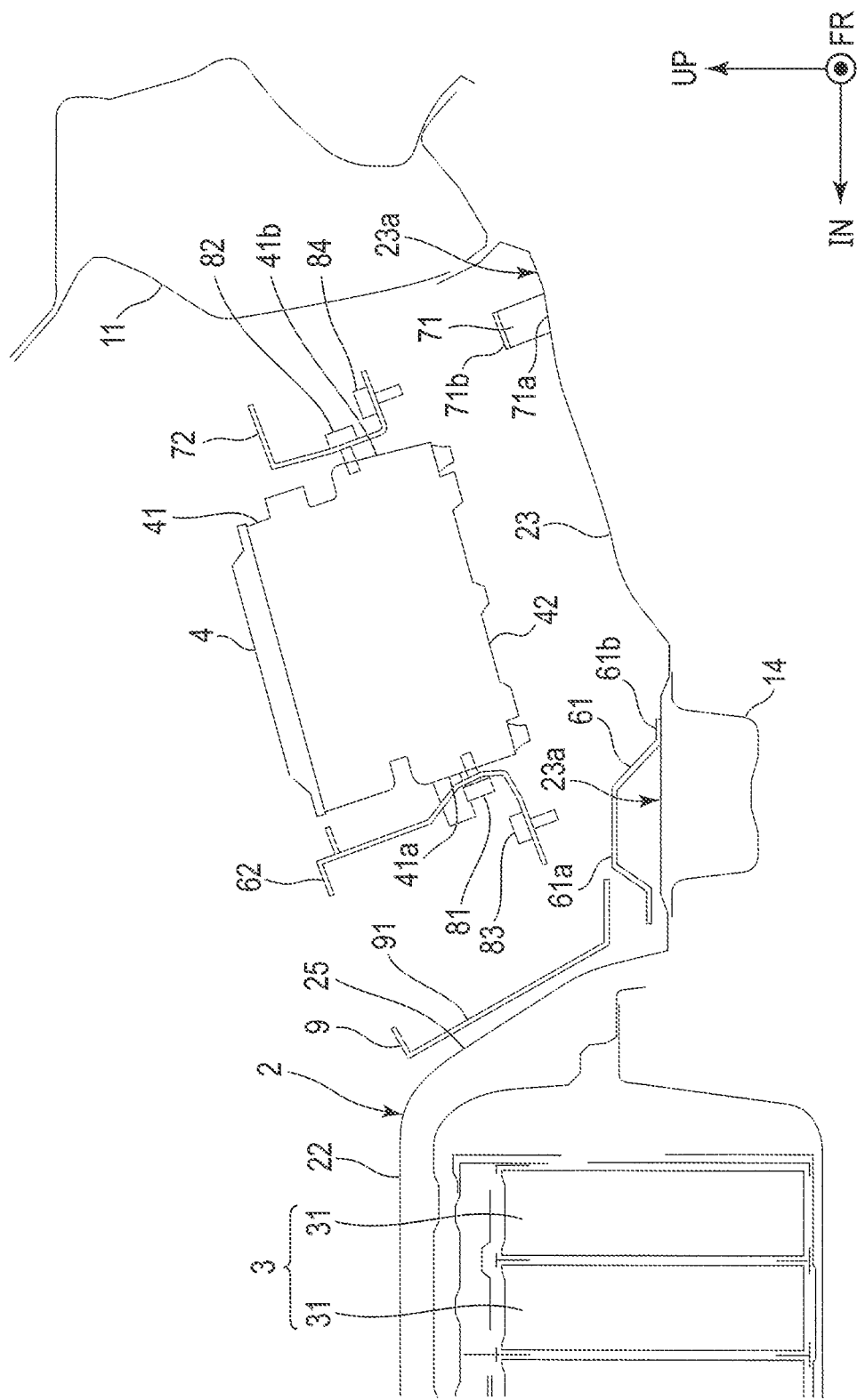
F I G. 6

BODY STRUCTURE OF VEHICLE

CROSS-REFERENCE TO RELATED APPLICATIONS

This application is based upon and claims the benefit of priority from prior Japanese Patent Application No. 2016-148744, filed Jul. 28, 2016, the entire contents of which are incorporated herein by reference.

BACKGROUND OF THE INVENTION

1. Field of the Invention

The present invention relates to a body structure of a vehicle equipped with electric apparatus, such as a plug-in hybrid electric vehicle (PHEV) or an electric vehicle (EV).

2. Description of the Related Art

Various kinds of electric apparatus are mounted in vehicles. For example, patent literature 1 (JP 5645147 B) discloses a vehicle body structure of a PHEV or EV in which the electric water heater (to be referred to as an electric heater, hereinafter) is mounted as a heat source for heating. In the vehicle body structure disclosed in Patent Literature 1, a battery pack is provided under the floor panel and an electric heater is provided on the floor panel. More specifically, the battery pack is located on an inner side with respect to a width direction of the vehicle, whereas the electric heater is located on an outer side. With this arrangement, in case of a lateral collision of the vehicle, the electric heater may be displaced to the inner side in the width direction of the vehicle and interfere with the battery pack depending on the degree of deformation of the vehicle body.

Since the electric heater is mostly formed by die casting, it is hard electric apparatus as compared to the battery pack. Therefore, in lateral collision of the vehicle, the apparatus is merely displaced to follow the deformation of the vehicle body without the apparatus itself being noticeably deformed (crushed or broken). Consequently, if the displaced electric heater interferes with the battery pack, the battery cell in the battery pack may be damaged.

In order to avoid such a problem, Patent Literature 1 proposes a vehicle body structure in which the floor panel is prepared to comprise an upper floor part and a lower floor part and the battery pack is placed under the upper floor part and the electric heater is placed on the lower floor part. With this structure, when a lateral vehicle collision occurs, a cross member of the vehicle body, specifically, a reinforcing member (seat cross member) which supports a seat above is bent, thereby lifting the floor panel upwards together with electric heater. Thus, the electric heater is guided over the battery pack to avoid interference between the electric heater and battery pack.

CITATION LIST

Patent Literature

Patent Literature 1: JP 5645147 B

According to one embodiment, a body structure of a vehicle includes a floor panel, a battery pack, an electric water heater (electric apparatus), and a bracket which mounts the electric water heater to the floor panel. The electric water heater is mounted to the floor panel so as to set a battery pack side of the electric apparatus higher.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a schematic diagram showing how the electric apparatus (electric heater) is mounted to the floor panel with a bracket according to the embodiment.

FIG. 6 is a schematic diagram showing a behavior of the electric apparatus (electric heater) in an initial state of lateral collision of a vehicle according to the embodiment.

DETAILED DESCRIPTION OF THE INVENTION

A vehicle body structure according to an embodiment of the present invention will be described with reference to FIGS. 1 to 7. The vehicle body structure of this embodiment is designed to protect onboard equipment in case of lateral collision of the vehicle, or more specifically, to prevent interference between an electric apparatus and its peripheral device. The vehicle body structure of this embodiment is applicable to any vehicles driven by an electric motor power-supplied from a battery pack, such as plug-in hybrid electric vehicles (PHEV) or electric vehicles (EV).

In this embodiment, a vehicle body structure will be described by focusing on an example of that prevents the interference between an electric water heater (to be referred to as an electric heater also, hereinafter), which is electric apparatus, and a battery pack, which is a peripheral device, in case of lateral collision of a vehicle. Note that the electric apparatus is not limited to an electric heater, but the vehicle body structure of this embodiment is applicable to the case where the apparatus is, for example, an inverter or a DCDC converter.

Figure 1:
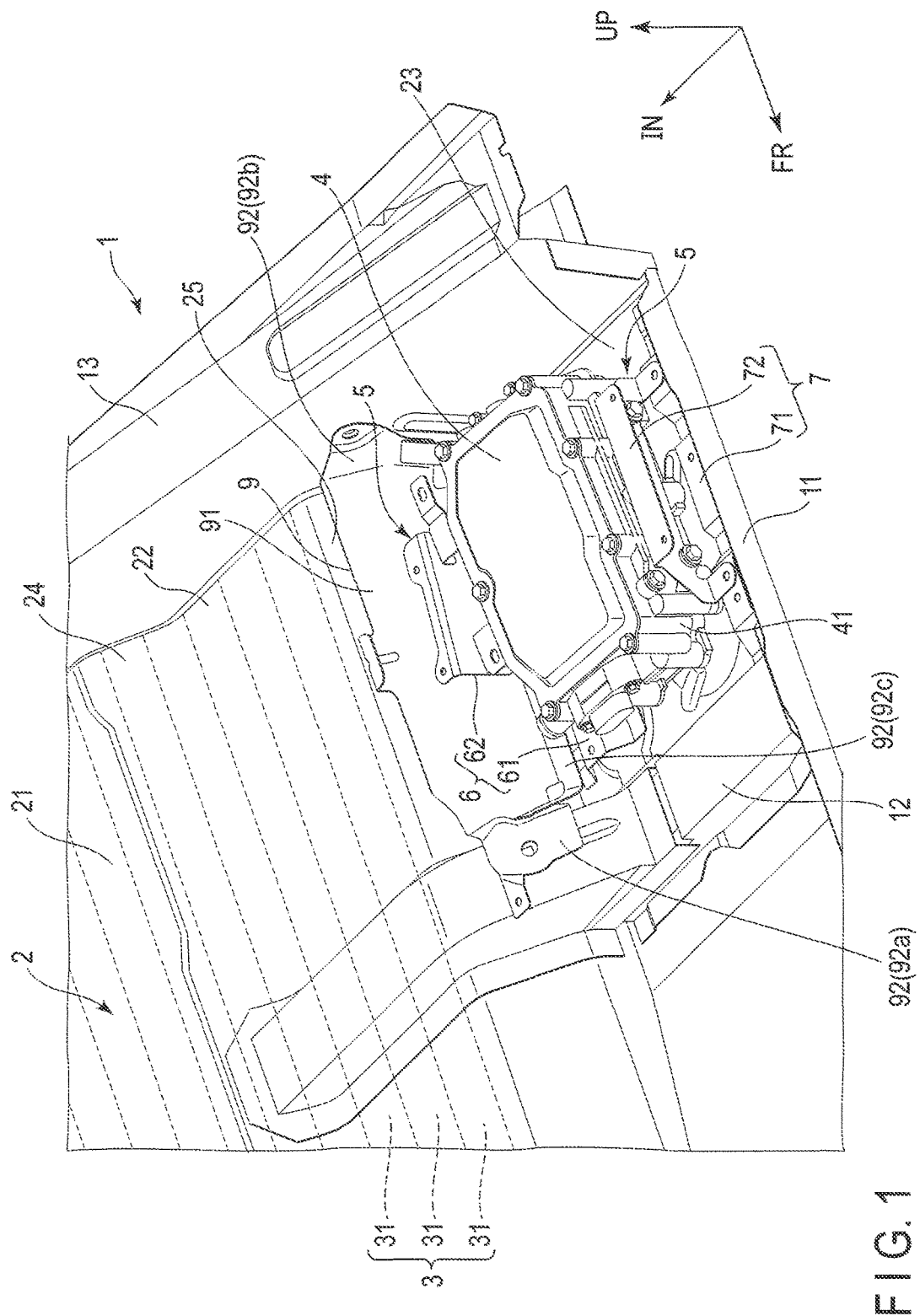
FIG. 1 is a perspective view showing an outline of a vehicle body structure according to an embodiment of the present invention.

FIG. 1 is a perspective view showing an outline of a vehicle body structure 1 to according to this embodiment. In FIG. 1, the direction indicated by an arrow FR is defined as a front (front side) of a vehicle, the reverse direction is a back (back side). Further, the direction indicated by an arrow UP is defined as an upper side (above) of the vehicle and its reverse direction is a lower side (below). Furthermore, the direction indicated by an arrow IN is defined as an inside (inner side) of the vehicle, and its reverse direction is an outside (outer side). The direction along the arrow IN corresponds to the width direction (lateral direction) of the vehicle. Note that the definitions of the directions used in FIG. 1 are also used in FIGS. 2 to 7, which will be described later.

As shown in FIG. 1, the vehicle body structure 1 comprises a floor panel 2, a battery pack 3 and an electric water heater 4 (to be referred to as the electric heater 4, hereinafter) arranged on the floor panel 2.

The floor panel 2 is a member which forms a floor surface which defines a cabin of the vehicle, and in this embodiment, it has a three-step structure of an upper floor part 21, a middle floor part 22 and a lower floor part 23 in which the height (the height along the vertical direction) lowers in this order. The upper floor part 21 is formed substantially in the center of the width direction of the vehicle, and the lower floor part 23 is joined to a pair of side sills 11 disposed respectively on both ends along the width direction. The middle floor part 22 is formed between the upper floor part 21 and the lower floor part 23 along the width direction. The upper floor part 21 and the middle floor part 22 are continuous via an inward inclined part 24, and the middle floor part 22 and the lower floor part 23 are continuous via an outward inclined part 25. The inward inclined part 24 inclines to gradually fall into an inner side from its continuation part to the middle floor part 22 towards its continuation part to the upper floor part 21. The outward inclined part 25 inclines to gradually fall into an inner side from its continuation part to the lower floor part 23 towards its continuation part to the middle floor part 22. The upper floor part 21 heaves upwards (cabin side) with respect to the middle floor part 22 and the lower floor part 23 and is continuing along a front-and-rear direction. With this structure, the floor panel 2 is divided into right and left portions along the width direction with respect to the upper floor part 21 as a border. On both right and left sides of the upper floor part 21, the middle floor part 22 and the lower floor part 23 respectively extend. The inward inclined part 24 is a boundary portion which partitions the upper floor part 21 and the middle floor part 22 from each other along the width direction, and the outward inclined part 25 partitions the middle floor part 22 and the lower floor part 23 from each other.

On top of the floor panel 2, seats where crew members sit down are attached. At a position of the floor panel 2 shown in FIG. 1, a front-left side seat (not shown) is attached. On a top surface of the floor panel 2, support members which support legs of the seat are provided.

The support members comprise front-leg support members (seat cross front members) which support front legs (not shown) of the seat and hind-leg support members (seat cross rear member) which support hind-legs (not shown). Note that only the hind leg support members 12 are shown in FIG. 1, and the illustration of the front-leg support members is omitted.

The hind leg support members 12 are built over between the inward inclined part 24 of the floor panel 2 and the side sills 11 so as to be parallel to the width direction of the vehicle. FIG. 1 shows, as an example, a tub-shaped hind leg support members 12 whose cross section is approximately rectangular, with an opened bottom, but the form of the hind leg support members 12 is not limited to this. On the other hand, the front-leg support members (not shown) is built over between the inward inclined part 24 of the floor panel 2 and the side sills 11 so as to be parallel to the width direction on a front side of the hind leg support members 12. Although the form of the front-leg support members is not particularly limited, but, for example, as in the case of the hind leg support members 12, it can be formed into a tub-like shape having an approximately rectangular cross section with an opened bottom. Thus, the front-leg support members and the hind leg support members 12 are reinforcing members which transmits the collision load at the time of lateral collision of the vehicle from the side sills 11 to the inner side in the width direction of the vehicle (for example, to the upper floor part 21 of the floor panel 2).

Further, on a rear side of the hind leg support members 12, a cross member 13 is provided as a reinforcing member. The cross member 13 is built over between the pair of side sills 11 so as to be parallel to the width direction of the vehicle. Although the form of the cross member 13 is not particularly limited, it can be formed into a tub-like shape having an approximately rectangular cross section with an opened rear surface.

The battery pack 3 comprises a plurality of battery cells (single batteries) 31 connected to each other. The battery cells 31 connected to each other are accommodated in a battery case (not shown). The electric motors (not shown) mounted in a PHEV or EV are driven by the power supplied from the battery pack 3.

The battery pack 3 is attached below the upper floor part 21 and the middle floor part 22 of the floor panel 2. In this embodiment, the battery case is fixed onto the bottoms of the upper floor part 21 and the middle floor part 22 so that the battery cells 31 are arranged in order along the width direction of the vehicle (lateral direction). The battery case is fastened to the bottom side of the upper floor part 21 and the middle floor part 22 via a predetermined mounting member (battery bracket) welded, for example to the bottom surface of the floor panel 2. Thus, the battery pack 3 is disposed under the floor panel 2 in substantially the center in the width direction so that the outermost battery cells 31 in the width direction are positioned to oppose the outward inclined part 25 of the floor panel 2.

The electric heater 4 comprises a liquid passage, an electric heater (exothermic module), a control board, etc. (all not shown), and an approximately rectangular parallelepiped housing 41 which accommodates the afore-mentioned members inside. The liquid passage and the housing 41 are formed by die casting from an aluminum alloy, for example. The housing 41 includes a container in which the liquid passage is fabricated, and a lid which covers the upper portion of the container. The upper ends of the side walls of the container and the lid are sealed therebetween. The control board is powered via a harness (not shown) connected to an external power source (not shown), and controls switching on/off of the electric heater and communication with ECU (engine control unit), etc.

The electric heater 4 is placed on the floor panel 2 and lateral to the battery pack 3, and more specifically, it is mounted on the floor panel 2 so as to be located on an outer side in the width direction of the vehicle with respect to the battery pack 3. FIG. 2 shows how the electric heater 4 is mounted to the floor panel 2. As shown in FIGS. 1 and 2, the electric heater 4 is mounted to a mounting surface 23a of the lower floor part 23 via a bracket (mounting member) 5. The electric heater 4 is mounted to the floor panel 2 so as to be inclined with a battery pack 3 side of the heater being higher in height, as will be described later in detail. When mounted to the lower floor part 23, the electric heater 4 is positioned so that a side wall part 41a of the housing 41 is close to the outward inclined part 25 of the floor panel 2. Thus, the electric heater 4 and the battery pack 3 are arranged along the width direction of the vehicle so as to partially overlap each other in a height direction (vertical direction). In other words, in terms of a horizontal view, at least a part of the electric heater 4 overlaps the battery pack 3. The electric heater 4 and the battery pack 3 are partitioned by the outward inclined part 25 of the floor panel 2.

As shown in FIG. 2, the bracket 5 includes an inner bracket 6 disposed inside the electric heater 4 in the width direction of the vehicle, and an outer bracket 7 on an outer side. The inner bracket 6 supports the electric heater 4 onto the lower floor part 23 of the floor panel 2 on an inner side in the width direction of the vehicle. On the other hand, the outside bracket 7 supports the electric heater 4 onto the lower floor part 23 on an outer side in the width direction of the vehicle.

The inner bracket 6 and the outer bracket 7 comprise lower brackets 61 and 71 and upper brackets 62 and 72, respectively, which are configured to be separable. The lower brackets 61 and 71 are panel-side brackets (to be referred to as panel-side brackets 61 and 71, hereinafter) fixed to the floor panel 2. On the other hand, the upper brackets 62 and 72 are heater-side (electric apparatus-side) brackets (to be referred to as heater-side brackets 62 and 72, hereinafter) fixed to the electric heater 4.

The panel-side brackets 61 and 71 are welded to the mounting surface 23a of the lower floor part 23 of the floor panel 2. On a rear side of the mounting surface 23a where the panel-side bracket 61 is welded, a floor side member 14 is disposed. On the other hand, the heater side brackets 62 and 72 are fastened to the side wall parts 41a and 41b of the housing 41 of the electric heater 4 with bolts 81 and 82, which are fastening members. In the side wall parts 41a and 41b of the housing 41, screw holes (not shown) which engage respectively with, for example, the bolts 81 and 82 are formed. The panel-side brackets 61 and 71 and the heater side brackets 62 and 72 are fastened together with bolts 83 and 84, which are also fastening members. Thus, the electric heater 4 is mounted to the lower floor part 23 of the floor panel 2 through the panel-side brackets 61 and 71 and the heater side brackets 62 and 72.

Figure 3:
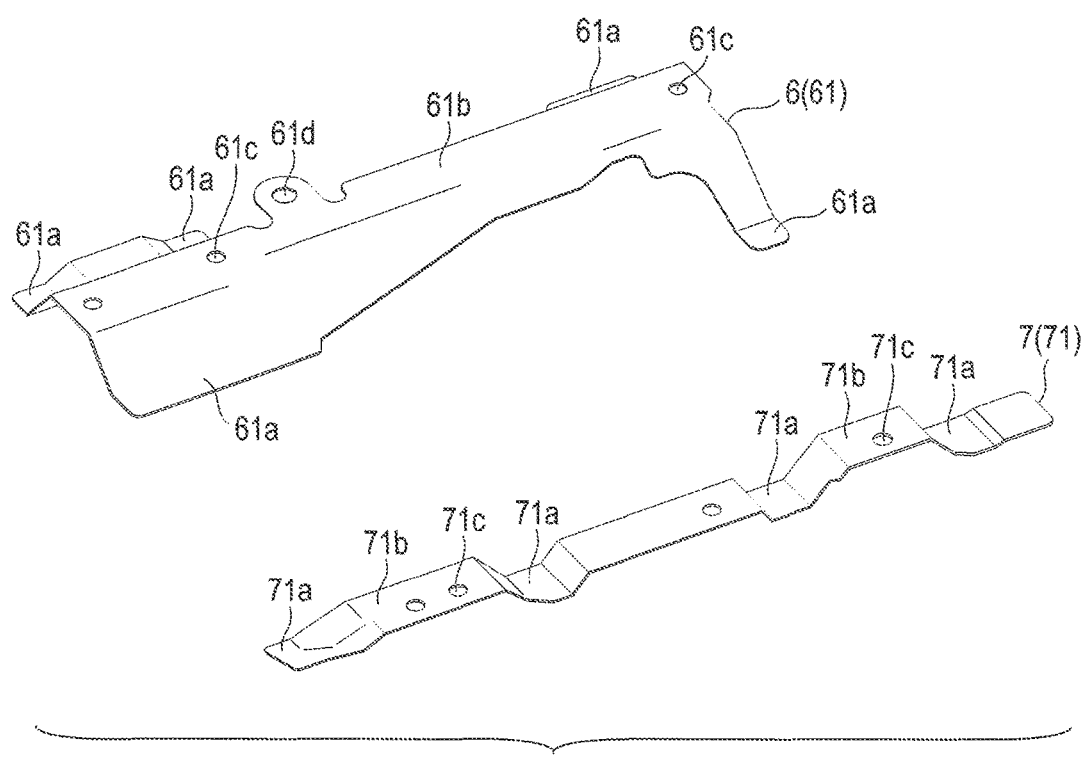
FIG. 3 is a perspective view showing a structure of a lower bracket (panel-side bracket) according to the embodiment.
Figure 4:
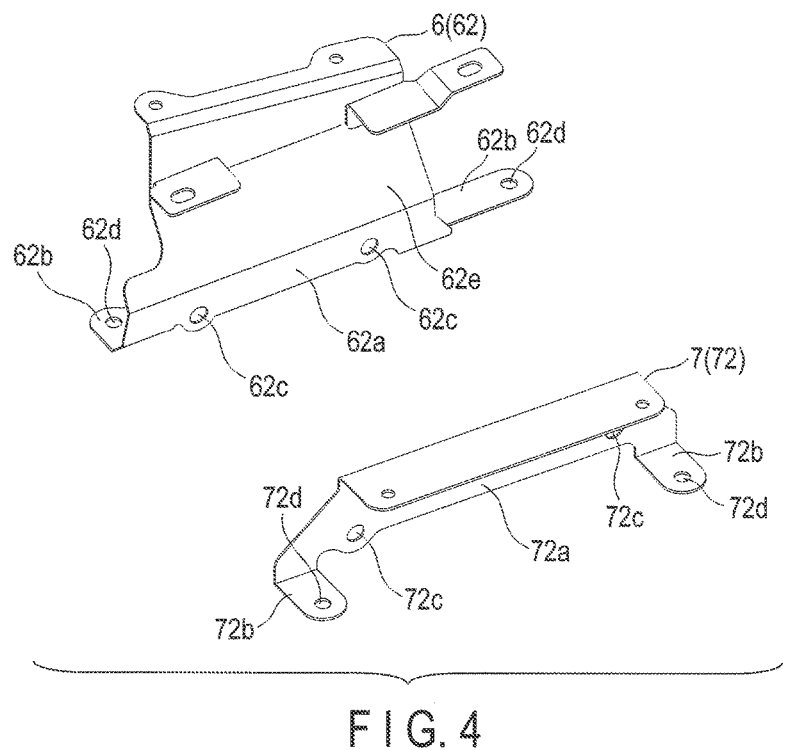
FIG. 4 is a perspective view showing a structure of an upper bracket (heater-side bracket) according to the embodiment.

FIG. 3 shows a structure of the panel-side brackets 61 and 71 and FIG. 4 shows a structure of the heater side brackets 62 and 72. The panel-side brackets 61 and 71 are plate members formed from an aluminum alloy or the like and include, respectively, base portions 61a and 71a and fixation portions 61b and 71b. The base portions 61a and 71a are parts welded to the lower floor part 23 of the floor panel 2. The fixation portions 61b and 71b are parts fastened respectively to the heater side brackets 62 and 72 (more specifically, the fixation portions 62b and 72b as will be described later) with the bolts 83 and 84. In the fixation portions 61b and 71b, through-holes (screw holes) 61c and 71c which respectively engage with the bolts 83 and 84 are formed.

In order to avoid the interference of the bolts 83 and 84 which engage with the through-holes 61c and 71c with the mounting surface 23a of the lower floor part 23, the fixation portions 61b and 71b are made continuous to the base portions 61a and 71a, respectively and stand from the base portions 61a and 71a according to the length of the bolts 83 and 84. Thus, when mounted to the lower floor part 23 with these brackets 5, the electric heater 4 is set in a state of floating (non-contact state) from the mounting surface 23a of the lower floor part 23.

The heater-side brackets 62 and 72 are plate-like members formed from an aluminum alloy or the like, and include the base portions 62a and 72a and the fixation portions 62b and 72b, respectively. The heater-side brackets 62 and 72 are thicker than the panel-side brackets 61 and 71 (in plate thickness). Therefore, the heater-side brackets 62 and 72 have resistance higher than that of the panel-side brackets 61 and 71 against the collision load at the time of lateral collision of the vehicle. On the other hand, the panel-side brackets 61 and 71 are thinner (in plate thickness) and therefore have resistance lower than that of the heater side brackets 62 and 72 at the time of lateral collision. The base portions 62a and 72a are parts to be fastened to the side wall parts 41a and 41b of the housing 41 of the electric heater 4 with the bolts 81 and 82. The fixation portions 62b and 72b are parts to be fastened to the fixation portions 61b and 71b of the panel-side brackets 61 and 71 with the bolts 83 and 84 and they are provided as bent from the lower ends of the base portions 62a and 72a. Through-holes 62c and 72c in which the bolts 81 and 82 are inserted are formed in the base portions 62a and 72a, and through-holes (screw holes) 62d and 72d which engage with the bolts 83 and 84 are formed in the fixation portions 62b and 72b, respectively.

Further, the heater-side bracket 62 includes an inclined portion 62e in addition to the base portion 62a and the fixation portion 62b. The inclined portion 62e is formed continuous to an upper part of the fixation portion 62b, and inclined so as to gradually fall down to the inner side from the continuation part to the fixation portion 62b towards the upper part. In this case, the inclined portion 62e is inclined substantially along the outward inclined portion 25 of the floor panel 2 and a guide portion 91 of the guide plate 9, which will be described later.

The bracket 5 (the inner-side bracket 6 and the outer-side bracket 7) supports the electric heater 4 onto the floor panel 2 (more specifically, the mounting surface 23a of the lower floor part 23) so as to position the inner side of the bottom 42 of the electric heater 4 (more specifically, the housing 41) higher than the outside in the width direction of the vehicle. That is, the bracket 5 sets the bottom 42 inclined with respect to the lower floor part 23 so as to position the electric heater 4.

The direction towards the inner side from the outside along the width direction of the vehicle corresponds to the direction in which the collision load is received by the vehicle at the time of lateral collision on the side where the electric heater 4 is installed. Therefore, while supported onto the floor panel 2 with the bracket 5, the electric heater 4 is set inclined with respect to the mounting surface 23a of the lower floor part 23 so as to position the back-side end in the impact input direction of the collision load (that is, the inner side of the vehicle) higher than the front-side end in the same direction (that is, the outer side of the vehicle).

FIG. 2 shows an example of the positions of the electric heater 4, the inner side bracket 6 and the outside bracket 7 with relative to each other in order to attach the electric heater 4 to the floor panel 2 so as to be inclined as such. In this case, the panel-side bracket 61 and the heater-side bracket 62 of the inner bracket 6 are fixed in a position PI1. In the position PI1, the fixation portion 61b of the panel-side bracket 61 and the fixation portion 62b of the heater-side bracket 62 are in contact with the mounting surface 23a of the lower floor part 23 so as to be substantially parallel thereto. Further, the panel-side bracket 71 of the outer bracket 7 and the heater-side bracket 72 are fixed in a position PO1. In the position PO1, the fixation portion 71b of the panel-side bracket 71 and the fixation portion 72b of the heater-side bracket 72 are in contact with the mounting surface 23a of the lower floor part 23 so as to be substantially parallel thereto. The position PI1 and the position PO1 are at substantially the same height from the mounting surface 23a of the lower floor part 23 of the floor panel 2.

Further, the heater-side bracket 62 of the inner side bracket 6 and the housing 41 of the electric heater 4 are fixed in a position PI2. Further, the heater-side bracket 72 of the outside bracket 7 and the housing 41 are fixed in a position PO2. The position PI2 and position PO2 are at substantially the same height from the mounting surface 23a of the lower floor part 23 of the floor panel 2. On the other hand, the heights of the position PI2 and the position PO2 from the bottom 42 of the electric heater 4 are different from each other, and specifically, the height of the position PI2 from the bottom 42 is lower than that of the position PO2. That is, the position PI2 where the inner side bracket 6 is fixed to the electric heater 4 is lower than the position 211 where the outer bracket 7 is fixed to the electric heater 4 in term of the height from the bottom 42 of the electric heater 4.

With the above-described setting of the positions PI1, PO1, PI2, and PO2 with relative to each other, the electric heater 4 can be set inclined to the floor panel 2 so as to position the inner side (the battery pack 3 side) of the bottom 42 in the width direction of the vehicle, higher than the outer side thereof.

As shown in FIGS. 1 and 2, the guide plate 9 is interposed between the electric heater 4 and the battery pack 3. More specifically, in terms of the width direction of the vehicle, the guide plate 9 is disposed on an outer side of the outward inclined portion 25 of the floor panel 2 which partitions the electric heater 4 and the battery pack 3 from each other, and also on an inner side of the electric heater 4. The guide plate 9 is a member for guiding the movement of the electric heater 4 when the heater is moved (displaced) to the inner side in the width direction of the vehicle by deformation of the side sills 11 and the floor panel 2 at the time of lateral collision of the vehicle. The guide plate 9 is a plate member formed from an aluminum alloy or the like, to be thicker than the heater-side brackets 62 and 72 (greater in plate thickness). That is, in this embodiment, the thickness increases from the panel-side brackets 61 and 71, the heater-side brackets 62 and 72, and the guide plate 9 in this order, and accordingly the resistance to the collision load at the time of lateral collision of the vehicle becomes higher in this order.

Figure 5:
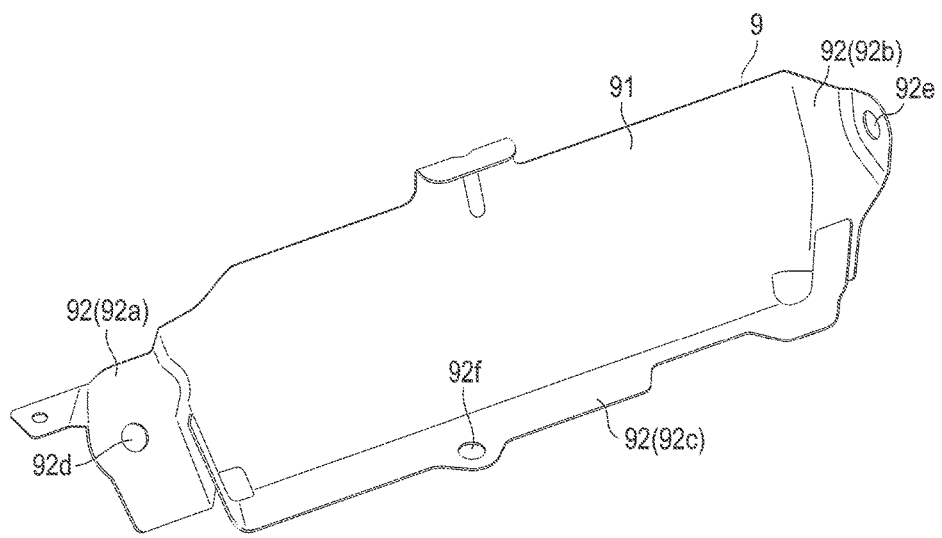
FIG. 5 is a perspective view showing a structure of a guide plate according to the embodiment.

FIG. 5 shows a structure of the guide plate 9. The guide plate 9 includes a guide portion 91 and a fixation portion 92. The guide portion 91 is a part which guides the electric heater 4 which is displaced at the time of lateral collision of the vehicle. The guide portion 91 forms a slope inclined to rise towards the battery pack 3. That is, the guide portion 91 is spaced further apart from the electric heater 4 towards the upper part from the lower part, and is inclined to be closer to the battery pack 3. More specifically, the guide portion 91 is inclined along with the outward inclined portion 25 to have approximately the same height as that of the outward inclined portion 25 of the floor panel 2, and is located to be slightly apart from the outward inclined portion 25. FIG. 5 shows a mode in which the guide portion 91 is formed into a flat slope, but it is alternatively possible to provide, for example, beads projecting from a slope surface in the guide portion 91 along the inclining direction in order to enhance the resistance to the collision load at the time of lateral collision of the vehicle.

The fixation portion 92 is a part fixed to a body-side member of the vehicle, and includes three fixation portions 92a, 92b and 92c. The fixation portions 92a, 92b and 93c are arranged in both ends and a middle portion of the guide portion 91 in the front-and-rear direction of the vehicle. The first fixation portion 92a is bent from a front end of the guide portion 91 and fastened to the hind leg support members 12 with bolts and nuts (not shown). The second fixation portion 92b is bent from a rear end of the guide portion 91 and fastened to the cross member 13 with bolts and nuts (not shown). Thus, the guide plate 9 is fixed to the hind leg support members 12 and the cross member 13 by the first fixation portion 92a and the second fixation portion 92b, thereby enhancing the rigidity along the front-and-rear direction. Further, the guide plate 9 is configured such that the guide portion 91 opposes the side wall part 41a of the electric heater 4 over between the hind leg support members 12 and the cross member 13 along the front-and-rear direction. The third fixation portion 92c is bent from the lower end of the guide portion 91 and fastened to the fixation portion 61b of the panel-side bracket 61 with bolts (not shown). In the first to third fixation portions 92a, 92b and 92c, through-holes 92d, 92e and 92f in which bolts are inserted are formed, respectively. Further, the hind leg support members 12 and the cross member 13 comprise through-holes (not shown) formed therein, communicable to the through-holes 92d and 92e, respectively. The fixation portion 61b of the panel-side bracket 61 comprises a through-holes 61d formed therein, communicable to the through-hole 92f (see FIG. 3).

Figure 7:
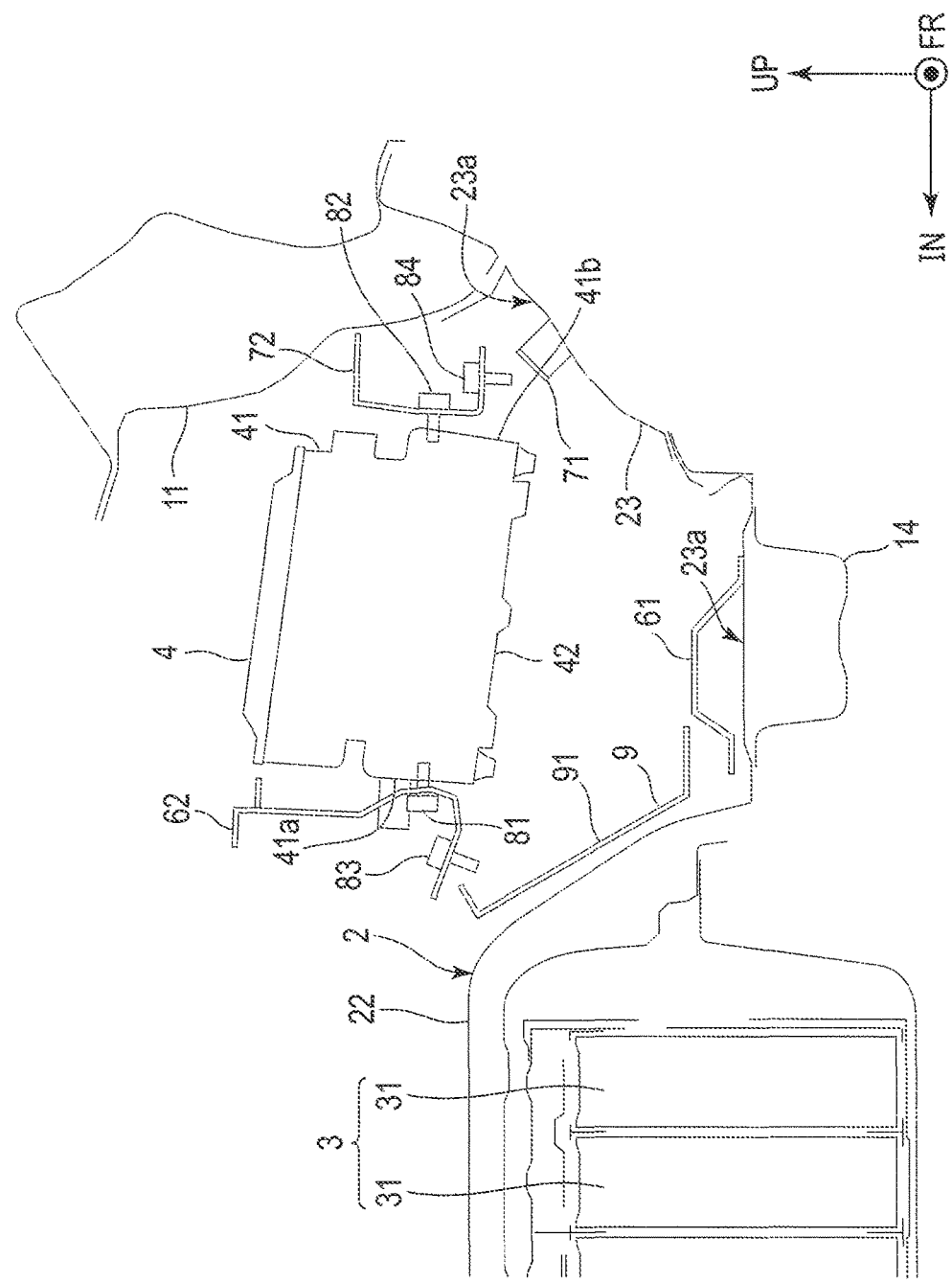
FIG. 7 is a schematic diagram showing a behavior of the electric apparatus (electric heater) in a final state of the lateral collision of the vehicle according the embodiment.

Next, the behavior of the electric heater 4 at the time of lateral collision of the vehicle will be described. FIGS. 6 and 7 show behavior of the electric heater 4 at the time of lateral collision. FIG. 6 is a diagram showing the behavior in an initial state of a lateral collision, and FIG. 7 shows a final state of the collision. Note that the state of the electric heater 4 before the collision is shown in FIG. 2.

When a vehicle laterally collides, the collision load is applied from the outer side of the vehicle towards the inner side along substantially parallel to a horizontal direction (a direction along the level surface) with respect to the side sill 11. Therefore, as shown in FIG. 6, the side sill 11 is deformed to move to the inner side in the width direction of the vehicle. By the deformation of the side sill 11, the floor panel 2 moves to the inner side in the width direction of the vehicle and deforms to uplift the lower floor part 23. Then, by the deformation of the floor panel 2, the panel-side brackets 61 and 71 and the heater-side brackets 62 and 72 are displaced so as to uplift the lower floor part 23.

The heater-side brackets 62 and 72 are thicker than the panel-side brackets 61 and 71 (in plate thickness), and therefore they have resistance higher than that of the panel-side brackets 61 and 71 against the collision load at the time of lateral collision of the vehicle. In other words, as compared to the heater-side brackets 62 and 72, the resistance of the panel-side brackets 61 and 71 against the collision load at the time of the lateral collision is weakened. Therefore, when uplifted with the lower floor part 23 of the floor panel 2, the panel-side brackets 61 and 71 are deformed more greatly than the heater-side brackets 62 and 72.

At this time, the relative positions between the base portions 61a and 71a and the fixation portions 61b and 71b of the panel-side brackets 61 and 71 are significantly displaced. Further, the panel-side brackets 61 and 71 are welded to the mounting surface 23a of the lower floor part 23 of the floor panel 2, and the heater-side brackets 62 and 72 are fastened to the side wall parts 41a and 41b of the housing 41 of the electric heater 4 with the bolts 81 and 82. Therefore, the collision load at the time of the lateral collision, or in other words, the force which deforms the panel-side brackets 61 and 71 acts on the fastened part (the positions PI1 and PO1 shown in FIG. 2) of the panel-side brackets 61 and 71 to the heater-side brackets 62 and 72 more strongly than on any other parts.

Thereby, as shown in FIG. 6, the bolts 83 and 84 come out from the deformed panel-side brackets 61 and 71, and the panel-side brackets 61 and 71 and the heater side brackets 62 and 72 are respectively separated from each other. As the panel-side brackets 61 and 71 and the heater-side brackets 62 and 72 are separated, the electric heater 4 is set substantially free from restraint with respect to peripheral members such as the floor panel 2 and the battery pack 3.

In this state, the electric heater 4 moves (displaces) further towards the inner side along the width direction of the vehicle. On the other hand, the guide plate 9 is interposed between the electric heater 4 and the battery pack 3, and therefore the electric heater 4, which is displaced, collides with the guide plate 9. More specifically, the heater-side bracket 62 fastened to the electric heater 4 collides with the guide portion 91 of the guide plate 9.

Then, the electric heater 4 moves along the guide portion 91 while the heater-side bracket 62 and the like, which collide with the guide portion 91 are pushed against the guide portion 91. That is, as shown in FIG. 7, the electric heater 4 moves upward and inward along the width direction of the case so as to swerve from the battery pack 3. Thus, the move direction of the electric heater 4 can be diverted from the position of the battery pack 3 without being especially restrained by the deformation of the floor panel 2. As a result, such a situation that the electric heater 4 interferes with the battery pack 3 can be avoided.

Moreover, since the guide portion 91 is inclined substantially along the inclination of the outward inclined portion 25 of the floor panel 2, if the guide plate 9 moves to the inner side along the width direction of the vehicle at the time of lateral collision, the guide portion 91 abuts to the outward inclined portion 25. With this structure, even if the guide plate 9 moves in this manner, the posture of the guide plate 9 can be stabilized, thereby making it possible to move the electric heater 4 smoothly along the guide portion 91. Consequently, the move direction of the electric heater 4 can be reliably diverted from the position of the battery pack 3.

As described above, according to this embodiment, with such a simple vehicle body structure 1 in which the panel-side brackets 61 and 71, the heater side brackets 62 and 72 and the guide plate 9 are merely provided, the behavior of the electric heater 4 at the time of lateral collision of the vehicle can be controlled, thereby making it possible to reliably avoid the interference with the battery pack 3.

Further, the above-described embodiments and modifications have been presented by way of example only, and are not intended to limit the scope of the inventions. Indeed, these novel embodiments and modifications may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

In the embodiment described above, the heater-side brackets 62 and 72 are formed thicker than the panel-side brackets 61 and 71. In other words, the panel-side brackets 61 and 71 are thinner than the heater-side brackets 62 and 72 (in plate thickness), and thus the resistance the panel-side brackets 61 and 71 against the collision load at the time of lateral collision of the vehicle is weakened as compared to that of the heater-side brackets 62 and 72. In connection with this, the panel-side brackets 61 and 71 and the heater side brackets 62 and 72 are separated from each other at the time of lateral collision of the vehicle, but the means to separate these brackets from each other is not limited to this.

Figure 8:
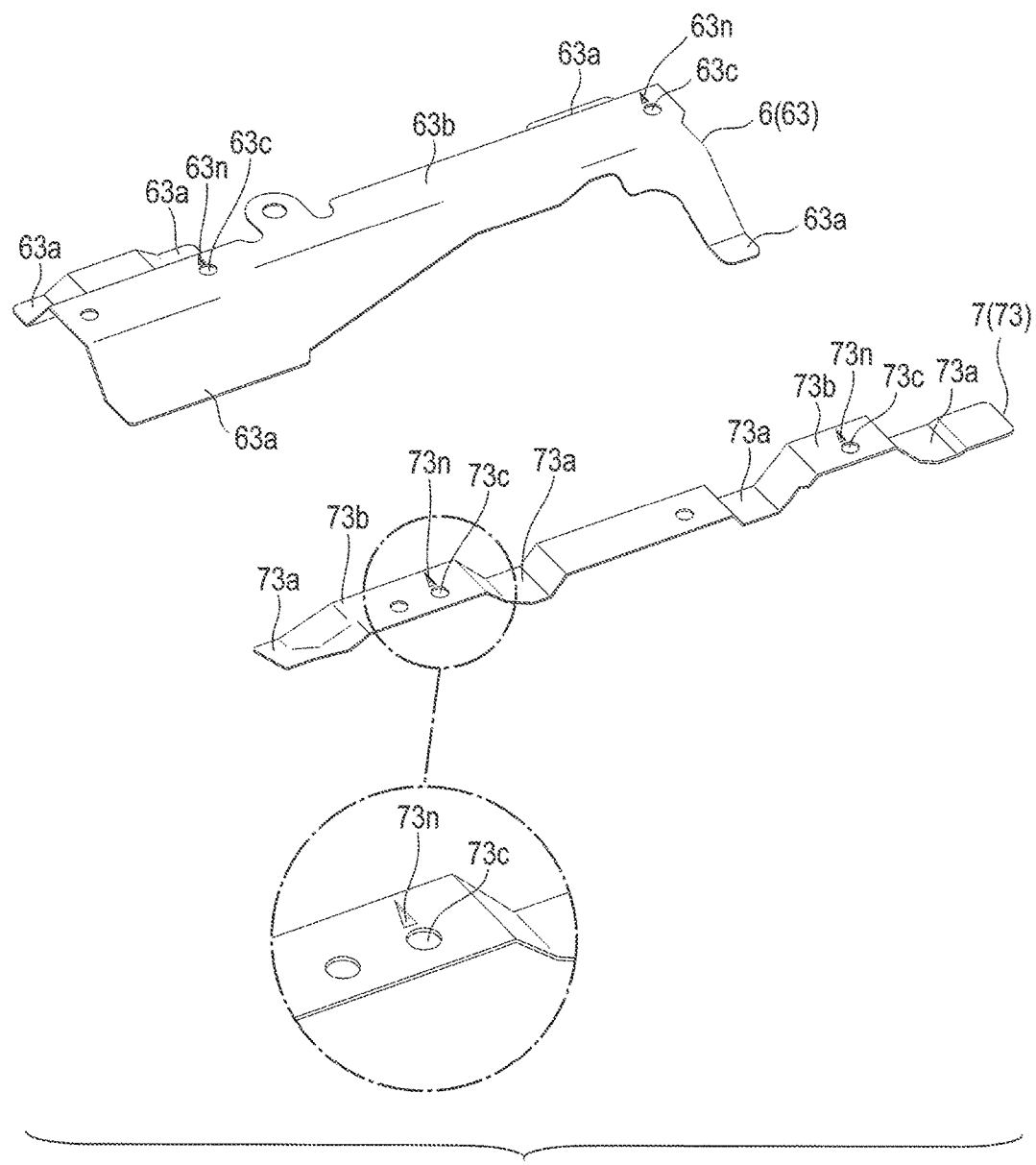
FIG. 8 is a perspective view showing a structure of a lower bracket (panel-side bracket) according to a modified example of the embodiment.

For example, FIG. 8 shows panel-side brackets 63 and 73 according to a modification of the panel-side brackets 61 and 71. The panel-side brackets 63 and 73 comprise respectively base portions 63a and 73a and fixation portions 63b and 73b, similar to those of the panel-side brackets 61 and 71. The fixation portions 63b and 73b comprise through-holes (screw holes) 63c and 73c formed therein, which engage with the bolts 83 and 84 (see FIG. 1). Further, along circumferential edges of the through-holes 63c and 73c, notches 63n and 73n are formed, respectively as weak portions, which are weaker in strength than other parts. FIG. 8 shows, as an example, a mode of the notches 63n and 73n, each making a triangle whose plane shape in the up-and-down direction narrows towards the inner side along the width direction of the vehicle.

As described above, also with the notches 63n and 73n formed along the circumferential edges of the through-holes 63c and 73c, the force which deforms the panel-side brackets 63 and 73 at the time of lateral collision of the vehicle can be impacted more strongly on the fastened parts (corresponding to the positions PI1 and PO1 shown in FIG. 2) between the panel-side brackets 63 and 73 and the heater-side brackets 62 and (see FIG. 4) than on other parts. The direction in which each of the notches 63n and 73n narrows (direction towards the inner side along the width direction of the vehicle) corresponds to the impacting direction of the collision load received by the vehicle at the time of lateral collision. With this structure, at the time of lateral collision, the force impacting on the fastened parts between the panel-side brackets 63 and 73 and the heater-side brackets 62 and 72 acts to expand the notches 63n and 73n.

With this structure, the panel-side brackets 63 and 73 can be fractured from the vicinities of the notches 63n and 73n at the time of lateral collision of the vehicle. Thereby, the bolts 83 and 84 can be pulled out from the panel-side brackets 63 and 73 to separate the heater-side brackets 62 and 72 from each other.

In this case, it suffices if the panel-side brackets 63 and 73 are formed thinner (in plate thickness) than the heater-side brackets 62 and 72, respectively, and further the notches 63n and 73n are formed in the panel-side brackets 63 and 73. Note that it is alternatively possible to form the panel-side brackets 63 and 73 to have the same thickness as that of the heater side brackets 62 and 72 and form the notches 63n and 73n.

What is claimed is:
1. A body structure of a vehicle, comprising:
a floor panel;
a battery pack disposed under the floor panel;
an electric apparatus disposed on the floor panel and lateral to the battery pack; and
a mounting member which mounts the electric apparatus to the floor panel,
the electric apparatus mounted to the floor panel being inclined, such that, prior to a lateral collision of the vehicle, a bottom end of a side of the electric apparatus facing the battery pack is higher than a bottom end of a side of the electric apparatus facing away from the battery pack.

2. The body structure of claim 1,
wherein, the electric apparatus is disposed on an outer side in a width direction of the vehicle with respect to the battery pack while at least partially overlapping the battery pack in a height direction;
the mounting member comprises an inner bracket which supports the electric apparatus to the floor panel on an inner side in the width direction of the vehicle, and an outer bracket which supports the electric apparatus to the floor panel on an outer side in the width direction of the vehicle; and
a position where the inner bracket is fixed to the electric apparatus is lower than a position where the outer bracket is fixed to the electric apparatus in height from a bottom of the electric apparatus.

3. The body structure of claim 2, wherein each of the inner bracket and the outer bracket comprises a lower bracket fixed to the floor panel and an upper bracket fixed to the electric apparatus that is separable from the lower bracket.

4. The body structure of claim 3,
wherein, each of the lower bracket and the upper bracket are plate members fastened to each other with fastening members, and comprise a through-hole in which the fastening members are inserted; and
the lower bracket further comprises a weaker part formed along a circumferential edge of the through-holes, weaker than other parts.

5. The body structure of claim 4,
wherein, the lower bracket and the upper bracket are plate members; and
the lower bracket is thinner than the upper bracket.

6. The body structure of claim 2, further comprising:
a guide plate interposed between the electric apparatus and the battery pack in the width direction of the vehicle, which guides displacement of the electric apparatus at a time of lateral collision of the vehicle,
wherein, the guide plate comprises a guide portion inclined to rise higher towards the battery pack.

7. The body structure of claim 6, wherein the mounting member comprises an inclined part inclined along the guide portion.

8. The body structure of claim 6, wherein the guide plate comprises fixation portions on both ends of the guide portion in a front-and-rear direction of the vehicle, fixed to a member on a vehicle body side.

9. The body structure of claim 8, wherein the mounting member comprises an inclined part inclined along the guide portion.

10. The body structure of claim 6,
wherein, the floor panel comprises a boundary part which partitions an upper floor region and a lower floor region along the width direction of the vehicle; and
the boundary part is inclined along the guide portion.

* * * * *